United States Patent Office 3,198,755
Patented Aug. 3, 1965

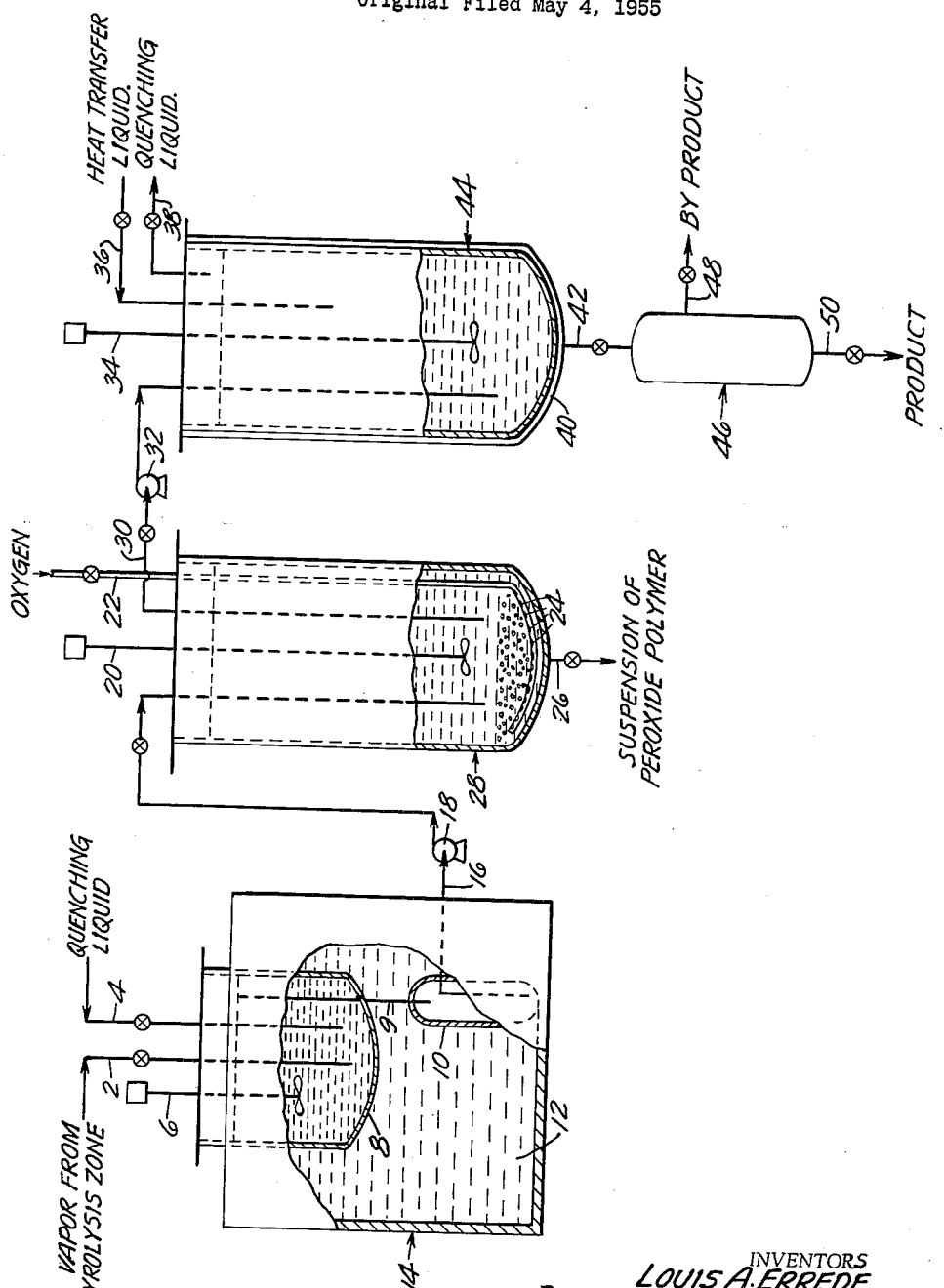

3,198,755
PREPARATION OF AROMATIC COMPOUNDS
Stafford L. Hopwood, Jr., Stamford, Conn., and Louis A. Errede, Roseville, Minn., assignors, by mesne assignments, to Minnesota Mining and Manufacturing Company, St. Paul, Minn., a corporation of Delaware
Division of application Ser. No. 505,904, May 4, 1955, now Patent No. 2,864,865, dated Dec. 16, 1958. Continuation of abandoned application Ser. No. 609,266, Sept. 11, 1956. This application May 2, 1962, Ser. No. 196,543
19 Claims. (Cl. 260—2)

This application is a division of copending application Serial No. 505,904, filed May 4, 1955, now U.S. Patent No. 2,864,865, and a continuation of Serial No. 609,266, filed September 11, 1956, now abandoned.

The present invention relates to the preparation of aromatic compounds. In one aspect, the invention relates to the preparation of a novel polymer containing peroxide linkages and aromatic nuclei. In another aspect, the invention relates to a method for converting this novel peroxide polymer to useful aromatic compounds. In a more particular aspect, the invention relates to an improved method for the preparation of terephthalaldehyde, p-hydroxymethyl benzaldehyde, p-xylylene glycol and their derivatives.

A valuable class of aromatic compounds having wide commercial application are those which contain one or more aromatic nuclei having substituents such as the formyl, hydroxymethyl and carboxy groups bonded to nuclear carbon atoms which are in the 1 and 4 position to each other or which substituents, in other words, are bonded to para positioned nuclear carbon atoms. Such compounds include, for example, terephthalaldehyde, p-hydroxymethyl benzaeldhyde, p-xylylene glycol and terephthalic acid.

It is known that condensation products which are useful for quite a considerable variety of applications are obtained by reacting terephthalaldehyde with aliphatic diamines containing more than five carbon atoms in the molecule, such as hexamethylene diamine. Such condensation products are thermosetting resins which may be utilized for films, tubing, molding powders and the like. The literature also reveals a luminescent dye produced by reaction of terephthalaldehyde with cyano acetic ester which dye is useful as a constituent in marking paints. As yet, however, such a thermosetting resin and luminescent dye have not been available commercially due to the high cost of the present-day methods for the preparation of terephthalaldehyde.

One of the best methods available at the present time for the production of terephthalaldehyde involves halogenation of p-xylene to the symmetrically substituted tetrahalo compound, that is, to a xylylene halide in which each of the methyl groups is substituted with two halogen atoms. The tetrahalo compound is then hydrolyzed to terephthalaldehyde at elevated temperatures in aqueous acid medium such as a 95 percent solution of sulfuric acid or nitric acid. This method of synthesis produces terephthalaldehyde in fair yield but the total loss of halogen as the hydrogen halide is considered expensive for a commercial process. Also the halogenation of p-xylene is difficult to control to give the symmetrically substituted tetrahalo compound selectively, and many steps are involved in the purification of the tetrahalo compound and its hydrolysis product, terephthaldehyde, thereby enhancing the cost of production of such compounds.

Other related known compounds such as p-hydroxymethyl benzaldehyde and p-xylylene glycol are also valuable compounds but, to date, their commercial application also has been limited due to the lack of their availability. p-Xylylene glycol, for example, is a valuable chemical intermediate and can be reacted with hydrogen chloride to yield p-xylylene dichloride, an insecticide. p-Hydroxymethyl benzaldehyde similarly finds its main use as a chemical intermediate and may be used, for example, for the production of dyes and insecticides.

It is an object of the present invention to provide an improved method for the preparation of aromatic compounds.

Another object is to provide an improved method for the production of aromatic compounds having formyl and/or hydroxymethyl groups substituted on nuclear carbon atoms which are in the 1 and 4 position to each other.

Another object is to provide a method for the manufacture of terephthalaldehyde, p-hydroxymethyl benzaldehyde and p-xylylene glycol which is commercially feasible and economical.

Another object is to provide a direct method for the manufacture of terephthalaldehyde, p-hydroxymethyl benzaldehyde and p-xylylene glycol in high yield and selectivity.

A further object is to provide a method for the manufacture of terephthalaldehyde, p-hydroxymethyl benzaldehyde and p-xylylene glycol with the minimum formation of by-products and with the maximum utilization of the starting materials.

A still further object is to provide a novel polymeric compound which is a valuable intermediate in the production of aromatic compounds.

A still further object is to provide a method for the decomposition of a novel aromatic polymeric compound to produce aromatic compounds.

A still further object is to provide a novel poly-p-xylylene type polymer which is useful as an intermediate in the production of para-substituted aromatic compounds.

Other objects and advantages of the present invention will become apparent to those skilled in the art from the accompanying description and disclosure.

These objects are accomplished by polymerizing a quinodimethane in the presence of oxygen to produce a novel polymer containing a recurring peroxide linkage and a recurring aromatically unsaturated cyclic nucleus, said recurring cyclic nucleus having the same basic ring structure as the quinodimethane monomer. The novel polymer thereby produced is thermally decomposed to produce aromatically unsaturated compounds.

The reaction of the quinodimethane and oxygen to produce the novel peroxide polymer of the present invention, and the reaction involving the thermal decomposition of the novel peroxide to produce aromatic compounds are effected, in general, at a temperature below about 200° C. and preferably at a temperature below about 150° C. The temperature at which considerable thermal decomposition of the novel peroxide polymer occurs varies depending upon the nature of the peroxide polymer and, in general, this temperature is above about 50° C. Thus when the reaction of the quinodimethane in the presence of oxygen is effected at a temperature between about 50° C. and about 200° C., the peroxide polymer which is produced is substantially instantaneously decomposed within this temperature range yielding useful aromatic compounds. Generally, the novel peroxide polymer is prepared by bringing the quinodimethane and oxygen into contact at a temperature below about 50° C., and preferably at a temperature between about −45° C. and about −80° C. which temperature may be as low as −120° C.

The production of the polymer peroxide may be accomplished in the vapor phase as well as in solution, and is preferably produced by reacting the quinodimethane and oxygen in solution in a mutual solvent. The decomposition of the novel polymer peroxide can be carried out adiabatically or isothermally, and is preferably carried out isothermally in a liquid heat transfer medium.

The aromatic compounds produced upon thermal decomposition of the novel peroxide polymer of the present invention are compounds containing an aromatically unsaturated nucleus having oxygenated aliphatic substituents, such as the formyl and hydroxymethyl groups, or nuclear carbon atoms of the aromatically unsaturated nucleus.

The reaction between the quinodimethane and oxygen to produce the novel peroxide polymer as described herein is a copolymerization reaction and leads to the production of a novel peroxide polymer having a recurring aromatically unsaturated cyclic nucleus, —Q—, two nuclear carbon atoms of which are each singly bonded to a methylene group, namely, a —CH$_2$— group; and a recurring peroxide linkage, namely, an —O—O— linkage, which peroxide linkage is bonded to —Q— through the carbon atom of the methylene group. Thus the general nature of the peroxide polymer produced in accordance with the present invention is represented by the following scheme:

—O—O—CH$_2$—Q—CH$_2$—O—O—CH$_2$
—Q—CH$_2$—O—O—CH$_2$—Q—CH$_2$— wherein Q is as above-discussed. For the purposes of convenience the following discussion and description is directed toward the preparation of a novel peroxide polymer in which the methylene groups are singly bonded to nuclear carbon atoms of —Q—, which nuclear carbon atoms are in the 1 and 4 position or para position to each other.

The quinodimethane monomer used in accordance with the present invention contains a diunsaturated six-membered ring to which two methylene groups are doubly bonded. The two methylene groups which are doubly bonded to the diunsaturated six-membered ring are bonded to nuclear carbon atoms of the ring which are preferably in the 1 and 4 position, or para position, to each other as, for example, in p-quinodimethane.

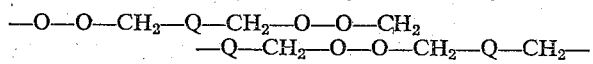

p-Quinodimethane has a quinoid type of symmetrically unsaturated nucleus, which nucleus contains non-conjugated nuclear unsaturation and which is symmetrically unsaturated by virtue of the fact that the 1 and 4 nuclear carbon atoms are doubly bonded to methylene groups.

The term quinodimethane as used herein also includes quinodimethanes containing more than the one diunsaturated liquid type ring. The quinodimethanes which contain more than the one quinoid type ring are preferably those in which the additional ring is a six-membered ring having aromatic unsaturation of the benzenoid type and which is fused to the quinoid ring as, for example, in the following quinodimethane structures:

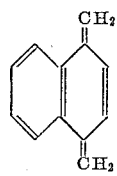

and

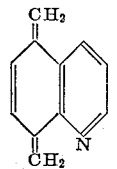

Suitable quinodimethanes which may be used in accordance with the present invention include p-quinodimethane, p-naphthaquinodimethane, and the heterocyclic analogues of such quinodimethanes having at least one nitrogen atom as part of the cyclic nucleus, said nitrogen atom or atoms being vicinal only to nuclear carbon atoms, as for example, in 2,5-quinopyrimidimyldimethane.

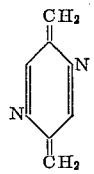

The nuclear substitution of the quinodimethanes used in accordance with the present invention is selected from at least one of the group consisting of hydrogen, normally gaseous halogens, and methyl radicals. Of the quinodimethanes having methyl groups and normally gaseous halogen atoms as nuclear substituents, the preferred types are the quinodimethanes containing from 0 to 2 nuclear methyl substituents or from 0 to 2 normally gaseous halogen atoms as nuclear substituents.

The products obtained by decomposition of the novel peroxide polymer produced in accordance with the present invention include compounds having an aromatically unsaturated nucleus and formyl and/or hydroxymethyl substituents on nuclear carbon atoms which are in the 1 and 4 position to each other, the remaining nuclear substitution of said 1,4-disubstituted aromatic compounds being selected from the group consisting of hydrogen, normally gaseous halogen atoms and methyl groups.

It is to be understood that the terms aromatic compound and aromatically unsaturated nucleus as used herein include both carbocyclic and heterocyclic compounds and nuclei having resonating type of unsaturation of the benzenoid type as is present in benzene, naphthalene, pyridine and quinoline.

The quinodimethanes used in accordance with the present invention are prepared by pyrolyzing aromatically unsaturated compounds having at least one six-membered aromatically unsaturated cyclic nucleus having methyl groups bonded to nuclear carbon atoms which are in the 1 and 4 position to each other, said aromatically unsaturated compound having additional nuclear substitution selected from at least one of the group consisting of the normally gaseous halogens, hydrogen and methyl radicals. The pyrolysis of such 1,4-dimethyl aromatic compounds is carried out at a temperature between about 700° C. and about 1300° C. and at a total pressure not higher than about 400 mm. mercury for a period of not more than one second followed by quenching of the pyrolyzed vapor to produce a quinodimethane. For best results the pyrolyzed vapor is quickly quenched to the temperature at which it is desired to effect the copolymerization of the quinodimethane with oxygen which, in accordance with the present invention, will be at a temperature below about 200° C.

The pyrolysis of the 1,4-dimethyl substituted aromatic compound is preferably carried out at a temperature within the range of about 950° C. to about 1300° C. For best results the aromatic vapor should be present at a partial pressure substantially not higher than 150 mm. mercury. Excellent results are obtained when the partial pressure of the 1,4-dimethyl substituted aromatic compound is 10 mm. mercury or somewhat below. The pyrolysis can be conducted in the presence of an inert gas, such as carbon dioxide, steam or nitrogen, for example, particularly when the partial pressure of the aromatic compound is 10 mm. mercury or below. In all cases the total pressure employed should be below 400 mm. mercury. Within the preferred pyrolysis temperature range the contact time should be within the range of from about 0.1 to about 0.001 second.

The quindomethanes thus formed tend to homopolymerize very quickly when in the vapor phase or in solution at a temperature above about −45° C. It has been found that in the absence of a polymerization initiator the quinodimethanes do not homopolymerize rapidly at a temperature below about −45° C. The hot vapors of pyrolyzed 1,4-dimethyl substituted aromatically unsaturated compounds are, therefore, quenched quickly by either being passed directly into a quenching zone in which the quinodimethane is brought to the temperature at which it is desired to effect copolymerization with oxygen, or by passing the vapors directly into a liquid maintained at the desired temperature of copolymerization. When it is desired to effect copolymerization of the quinodimethane and oxygen at a temperature between about −45° C. and about 200° C., the rapid quenching step and reaction of the quinodimethane with oxygen should be carried out simultaneously so that copolymerization is the main reaction, and so that the competing reaction of homopolymerization of quinodimethane is kept at a minimum.

The quinodimethane can be quenched and stored in stable concentrated form in a cold liquid maintained at a temperature below about −45° C., and subsequently employed in accordance with the present invention. The liquid used for quenching may be of any composition which remains liquid at the necessary temperature range and which has a relatively low partial pressure at about −45° C. consistent with the upper total pressure limit of 400 mm. mercury pressure and preferably low enough to permit operation below 10 mm. mercury pressure. The liquid should also be substantially non-reactive with the quinodimethane formed, although liquids which react to some slight degree with the compounds formed may be used. Among the specific liquids which may be used are the paraffinic and cycloparaffinic hydrocarbons of low freezing point, such as hexane, petroleum ether, cyclopentene and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloro ethyl benzene, o-fluoro toluene and 1,1-dichloroethane; carbonyl compounds of low freezing point such as acetone, methyl ethyl ketone and methyl isobutyl ketone; ethers of low freezing point, such as diethyl ether, ethyl n-propyl ether and tetrahydrofurane; alcohols of low freezing point, such as methanol, ethanol and isopropyl alcohol; and other normally liquid compounds of low freezing point, such as carbon disulfide. If desired, liquids of low freezing point may be obtained by the blending of two or more compounds of higher freezing point. For example, mixtures of carbon tetrachloride and chloroform may be used.

A more detailed description concerning the preparation of the quinodimethanes used in accordance with the present invention can be found in copending application, Serial Number 386,106, filed in the names of L. A. Errede and B. F. Landrum on October 14, 1953, now U.S. Patent No. 2,777,005.

In order to obtain the optimum yield of the novel peroxide polymer of this invention, reaction conditions are employed which enable a relatively high concentration of oxygen to be brought into intimate contact with the quinodimethane at a temperature at which homopolymerization of the monomer is at a minimum and at which the peroxide polymer does not decompose to any appreciable extent. It has been observed that the novel peroxide polymer of the present invention decomposes considerably at a temperature above about 50° C. It also has been observed that the quinodimethane tends to homopolymerize considerably at a temperature above about −45° C. and that small amounts of oxygen initiate or catalyze the homopolymerization reaction. In order to obtain the peroxide polymer in good yield, it is preferred, therefore, to effect the reaction between the quinodimethane, such as p-quinodimethane, and oxygen at a temperature below about 50° C. and preferably at a temperature below about −45° C., and to maintain a relatively high concentration of oxygen, that is, a concentration of oxygen of at least 0.1 mol per mol of quinodimethane during the copolymerization reaction. When carrying out the reaction between about −45° C. and about 50° C., whether in the vapor phase or in solution, it is important that the quinodimethane be reacted with a relatively high concentration of oxygen as soon as the quinodimethane is brought to a temperature within this range in order to keep the competing reaction of homopolymerization of the quinodimethane at a minimum.

It has been found that the copolymerization reaction is more easily controlled and more convenient to carry out in solution and can be so effected by saturating an organic liquid with oxygen and introducing the quinodimethane monomer into such a solution or by contacting oxygen with a solution of the quinodimethane. In order to obtain high yields of the novel peroxide polymer of the present invention and to incorporate a considerable amount of oxygen into the polymer, the conditions of copolymerization are controlled so that a high concentration of oxygen, that is, between about 0.1 mol and 10 moles of oxygen per mol of quinodimethane, is brought into contact with the quinodimethane monomer. This is accomplished by employing a solvent in which oxygen is relatively soluble as the medium in which the copolymerization is effected and/or by maintaining the ratio of the volume of the solution-oxygen interphase to solution phase at a maximum, and by conducting the copolymerization at a temperature below about −45° C. and preferably at a temperature as low as −80° C.

The above-mentioned liquid which may be used for quenching may also be employed as the liquid in which copolymerization is effected, but of these the polar solvents such as acetone, methyl ethyl ketone, methyl isobutyl ketone, ethyl acetate, methanol, ethanol and diethyl ether, are preferred inasmuch as oxygen is more soluble in such polar solvents.

The ratio of solution-oxygen interphase to solution phase is kept at a maximum by maintaining vigorous agitation of the reaction mixture during copolymerization, and/or by either spraying a solution of the monomer as a mist into a chamber filled with oxygen or by passing a large volume of oxygen through a multitude of tiny orifices at the bottom of the cold solution of the monomer. A large throughput of air or oxygen is introduced into the cold monomer solutions, or enough oxygen or air to convert the solution to an aerified bed of tiny air or oxygen bubbles. To accomplish this the air or oxygen is introduced at a rate which, in general, is between about 0.01 cubic foot per minute and about 1.0 cubic foot per minute.

Temperatures below about −45° C. are preferred as the temperatures of copolymerization not only because homopolymerization of the quinodimethane monomer is at a minimum at such temperatures but also because of the increased solubiilty of oxygen at these low temperatures. When the solution of quinodimethane is saturated with oxygen or air at a temperature below about −45° C., the reaction may be completed at this temperature or the reaction mixture may be warmed to a higher temperature such as 0° C. or room temperature (25° C.) while introducing oxygen at such a rate so as to maintain a high concentration of oxygen throughout the copolymerization. The over-all time of reaction may vary over relatively wide limits such as between about 10 minutes and about 30 hours, but in general the copolymerization reaction is carried out for a reaction time ranging between about one-half hour and about 10 hours. Upon completion of the reaction, the polymer peroxide is collected as a white powder.

The structure of the peroxide polymer generally is determined by percent composition analysis, infrared analysis and by a study of the products obtained upon decomposition of the polymer. It has been found that, in general, the novel peroxide polymer of the present invention decomposes when heated at elevated temperatures and that no softening or melting point is observed at or below the temperature at which decomposition occurs.

The novel peroxide polymer produced in accordance with the present invention contains the successively recurring unit, —O—CH$_2$—Q—CH$_2$—O—, and may also contain the successively recurring unit, —CH$_2$—Q—CH$_2$—, wherein Q in both recurring units is as previously discussed. More specifically Q is an aromatically unsaturated cyclic nucleus containing at least one six-membered ring having aromatic unsaturation and is bonded at nuclear carbon atoms which are in the 1 and 4 positions to each other, the nuclear substitution of Q being selected from at least one of the group consisting of normally gaseous halogens, hydrogen and methyl radicals. The Q radical is preferably selected from the group consisting of a benzene nucleus, a napthalene nucleus and an aromatically unsaturated heterocyclic nucleus containing at least one heteronitrogen atom, the nitrogen atom or atoms being vicinal only to nuclear carbon atoms, the nuclear substitution of said nuclei being as previously discussed with regard to the nuclear substitution of the quinodimethanes.

The preferred peroxide polymer of the present invention is that containing the recurring unit, —O—CH$_2$—Q$_a$—CH$_2$—O— or the recurring units, —O—CH$_2$—Q$_b$—CH$_2$—O—, wherein Q$_a$ is a benzene nucleus bonded at nuclear carbon atoms which are in the 1 and 4 position to each other and contains from 0 to 2 methyl nuclear substituents, and wherein Q$_b$ is a benzene nucleus bonded at nuclear carbon atoms which are in the 1 and 4 position to each other and contains from 0 to 2 normally gaseous halogen atoms. The particularly preferred peroxide polymer produced in accordance with the present invention is that containing the recurring unit,

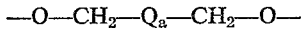

which is referred to herein as poly-p-xylylene peroxide.

It has been found that the novel peroxide polymer produced in accordance with the present invention is a polymer in which the recurring unit,

—O—CH$_2$—Q—CH$_2$—O— comprises between about 10 percent and almost 100 percent of the total monomer units in the polymer and in which the recurring units, —CH$_2$—Q—CH$_2$—, comprises between 0 percent and about 90 percent of the total monomer units in the polymer. The total number of monomer units in the peroxide polymer may be as high as 500 but generally the total number of monomer units ranges between about 100 and about 250.

In order to obtain a high yield of the peroxide polymer consisting essentially of the oxygen-containing monomer unit, that is, between about 50 percent and about 100 percent of the —O—CH$_2$—Q—CH$_2$—O— unit, the copolymerization of oxygen and quinodimethane is preferably effected in a polar solvent such as acetone at temperatures below —45° C. and under conditions so that the maximum amount of oxygen is brought into contact with the quinodimethane as above-described. At high temperatures, and when a non-polar solvent such as hexane and toluene are employed, and when only moderate agitation of the reaction mixture is employed, the number of —O—CH$_2$—Q—CH$_2$—O— units ranges, in general, between about 10 percent and about 50 percent of the total units in the polymer.

The peroxide polymer in which the oxygen-containing units comprise more than one-half of the total units in the polymer tends to decompose very rapidly and sometimes explosively at temperatures above 100° C. and thus care must be taken when handling this compound at elevated temperatures. The peroxide polymer in which the oxygen-containing monomer units comprise more than one-half of the total monomer units in the polymer is utilized primarily as an intermediate as herein described.

The peroxide polymer in which the oxygen-containing units comprise less than one-half of the total monomer units in the polymer decomposes very smoothly at the temperatures employed to decompose the polymer. This latter type peroxide polymer is useful as such and can be pressed into translucent and flexible plastic sheets at a temperature between about 300° F. and about 500° F. and at pressures between about 1000 and about 3000 pounds per square inch gage.

It has been found that carbonyl compounds and especially aldehydes facilitate the addition of oxygen to the quinodimethane monomer. The polymer peroxide obtained by copolymerization of a quinodimethane and oxygen in the presence of an aldehyde leads to the polymer peroxide having a higher per cent of oxygen-containing monomer units than the copolymer obtained under the same conditions in the absence of an aldehyde. The mol ratio of aldehyde to quinodimethane may vary over relatively wide limits without departing from the scope of this invention. As a practical matter, however, the aldehyde is employed in a mol ratio of aldehyde to quinodimethane which is less than 10:1 and, in general, the mol ratio of aldehyde to quinodimethane will range between about 1:10 and about 8:1. Typical examples of suitable aldehydes which may be added to the solution in which copolymerization is effected are formal, acetaldehyde, propanal, benzaldehyde, terephthalaldehyde and other such aliphatic and aromatic aldehydes.

Evidence has been found which indicates that when the peroxide polymer of this invention contains both of the recurring units, —O—CH$_2$—Q—CH$_2$—O— and —CH$_2$—Q—CH$_2$—, each unit occurs in block form along the polymer chain, and that the oxygen is not distributed statistically along the polymer chain. The fact that this is so is based upon the observation that when the polymer peroxide is decomposed at a temperature below 200° C., a mixture of 1,4-dialdehyde, a 1,4-hydroxymethyl aldehyde and a 1,4-glycol is obtained and that, in general, the 1,4-disubstituted aromatic compounds have the same basic cyclic nucleus as the quinodimethane monomer from which the peroxide polymer was obtained, and that, in general, the formyl and/or hydroxmethyl groups are separated by no more than one aromatic nucleus.

As above-stated, the novel peroxide polymer of the present invention is decomposed at a temperature between about 50° C. and about 200° C. and preferably below 150° C. to yield a mixture of aromatically unsaturated compounds substituted in the 1 and 4 positions with oxygen-containing groups such as the formyl and/or hydroxymethyl groups. These 1,4-disubstituted aromatic compounds may be represented by the general formula, A—Q—B, wherein A and B are selected from the group consisting of hydroxymethyl (—CH$_2$OH) and formyl (—CHO) groups, and wherein Q is the same as previously discussed. For example, when poly-p-xylylene peroxide is decomposed at a temperature between about 50° C. and about 150° C. a mixture of terephthalaldehyde, p-hydroxymethyl benzaldehyde and p-xylylene glycol is obtained as represented by the following illustrative equation:

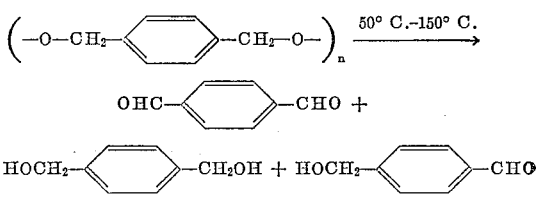

wherein $n$ is an integer between about 3 and about 500.

It is significant that only one dialdehyde, namely, terephthalaldehyde, is obtained when the poly-p-xylylene peroxide of the present invention is decomposed thereby indicating that, depending upon the copolymerization reaction conditions employed, the poly-p-xylylene peroxide is composed only of the oxygen-containing monomer unit, or that it is composed only of blocks of the oxygen-containing monomer units and blocks of the monomer unit,

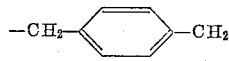

The main by-products of the decomposition reaction are hydrogen, and a polymeric material consisting essentially of the —$CH_2$—Q—$CH_2$— monomer units when such units are present in the peroxide polymer.

As above-indicated, the decomposition of the novel peroxide polymer of the present invention may be carried out adiabatically by decomposing substantially dried peroxide polymer at a subatmospheric pressure which may be as low as 0.001 mm. mercury pressure, and which pressure is preferably between about 0.1 mm. and 200 mm. mercury. Such decomposition is easier to control if the peroxide polymer is used in finely divided form by which is meant a particle size minute enough to pass through an 80 inch mesh screen.

The decomposition is preferably carried out isothermally in a liquid heat transfer medium in which the polymer peroxide is suspended in finely divided form. Typical examples of suitable liquids which may be employed as the heat transfer medium are water, halogenated hydrocarbons such as carbon tetrachloride and chloroform, aromatic compounds such as benzene, toluene, p-cymene, and organic oxygenated compounds such as acetone, methylisobutyl ketone, methylisobutyrate and benzyl benzoate or any mixture of such liquids. Water is the preferred liquid heat transfer medium not only because its use keeps the cost of the process down, but also because it allows for a facile way of separating the products of decomposition due to the fact that the solubilities of the products in water vary considerably.

The time of the decomposition reaction may vary over relatively wide limits without departing from the scope of the present invention and in general the reaction time is dependent upon the temperature employed to effect decomposition. At temperatures above 100° C. the decomposition of the peroxide polymer is effected within a range of between about 10 minutes and about 24 hours. At temperatures below 100° C. the decomposition reaction is completed within about one-half hour and about a week, and generally in less than 72 hours.

The mixture of products obtained upon decomposition is filtered whereby any polymer containing the

—$CH_2$—Q—$CH_2$— units is separated, the decomposition products, that is, the A—Q—B compounds, remaining in solution. The solution is then cooled until the dialdehyde comes out of solution and, in general, it separates from solution as a crystalline material. The glycol and aldehyde-alcohol which, in general, remain in the aqueous solution are then extracted exhaustively with a suitable solvent such as ether, benzene, toluene, chloroform and carbon tetrachloride. The two products are then separated from the extract by distillation and/or crystallization depending upon the physical nature of the product.

The preferred types of 1,4-disubstituted aromatic compounds produced in accordance with the present invention are those having the general formula A—$Q_a$—B and A—$Q_b$ wherein A, B, $Q_a$ and $Q_b$ are the same as previously discussed.

The relative yields of the aromatic compounds obtained upon decomposition depends upon the reaction medium and the temperature of decomposition. For example, the maximum yield of dialdehyde is obtained when the peroxide polymer is decomposed at a temperature between about 100° C. and about 200° C., and preferably at a temperature between about 100° C. and about 150° C. Lower yields of the dialdehyde and higher yields of the glycol and aldehyde-alcohol are obtained when the decomposition is effected at a lower temperature, that is, between about 50° C. and about 100° C.

The yield of glycol is further enhanced by adding a reducing agent including inorganic salts and organic mercaptans and amines to the medium in which decomposition is effected. Typical examples of suitable reducing agents are ferrous sulfate, sodium hyposulfite, cuprous sulfate; mercaptans such as butyl mercaptan and thiophenol; and amines such as t-butylamine, dimethylaniline and N-methylaniline. The weight ratio of reducing agent to peroxide polymer as used in accordance with the present invention will range, in general, between about 1:2 and about 3:1, and preferably between about 1:1 and 1.2:1. The presence of elemental iron filings during the decomposition reaction is also effective in enhancing the yield of glycol, and is particularly effective when used in conjunction with the inorganic salts.

It has been found that when the decomposition of the peroxide polymer is carried out in an oxidizing medium, such as aqueous nitric acid and aqueous chromic acid, a diacid having the formula HOOC—Q—COOH is produced in good yield. This decomposition of the peroxide polymer in oxidizing media may be effected under reflux conditions and, in general, the temperature of reaction is preferably between about 30° C. and about 125° C. For example, oxidation of poly-p-xylylene peroxide in an aqueous solution of potassium dichromate acidified with sulfuric acid, at a temperature of about 75° C. leads to the production of terephthalic acid in good yield and selectivity. This oxidation of poly-p-xylylene peroxide represents an improved process for the production of terephthalic acid which acid is presently prepared by the less desirable process involving air oxidation of p-xylene.

The accompanying drawing is presented as a better understanding of the present invention. It represents a diagrammatical elevational view, partly in cross-section, of an arrangement of suitable apparatus for carrying out the preferred embodiment of the present invention.

The apparatus as shown comprises a quenching assembly 14, a copolymerization chamber 28, and a decomposition chamber 44. Although the following discussion of the use of this apparatus is directed toward the preparation of poly-p-xylylene peroxide and to its decomposition to produce terephthalaldehyde, p-hydroxymethyl benzaldehyde and p-xylylene glycol, it is to be understood that the same discussion applies, in general, to the preparation and decomposition of the other novel peroxide polymers of the present invention.

Referring to the accompanying drawing, the quenching assembly 14 comprises a quenching vessel 8 fitted with spill-over 10 having the conduit 9 attached thereon, and a low temperature bath 12 which surrounds both the quenching vessel 8 and spill-over 10. The low temperature bath is maintained at a temperature below —45° C. and, in general, it consists of a solid carbon dioxide-acetone mixture. The quenching vessel 8 is further fitted with an agitator 6, an inlet 4 by means of which the quenching liquid such as acetone is introduced into the quenching vessel, an inlet 2 by means of which p-quinodimethane vapor is introduced into the quenching vessel, and a vacuum line which is not shown. The purpose of conduit 9 and spill-over 10 is to maintain the level of liquid in the quenching vessel at a constant level.

The hot vapors of p-quinodimethane are transferred to the quenching vessel 8 by means of conduit 2 as soon as they are formed in the pyrolysis zone which is not shown in the drawing. The hot vapors of p-quinodimethane are rapidly quenched in acetone, for example, contained in the quenching vessel 8, the quenching of vapor being carried out at subatmospheric pressure as described herein and preferably at a temperature of —45° C. or below. The level of the solution in the quenching vessel 8 may be kept at a sufficiently high level so that the solution of p-quinodimethane overflows continuously into the spill-over 10 by means of conduit 9. The rate of discharge of solution from the quenching vessel 8 into the spill-over 10 is regulated by the rate at which the quenching liquid is introduced into the quenching vessel by means of the conduit 4. The cold solution of p-quinodimethane monomer as it flows through conduit 9 into spill-over 10 is transferred from the spill-over into the copolymerization chamber 28 by means of conduit 16 having the gear pump 18 attached thereon.

The copolymerization of p-quinodimethane and oxygen in the copolymerization chamber 28 is preferably carried out at atmospheric pressure. The copolymerization chamber 28 is fitted with a vent which is not shown, a suitable means of agitation 20, and an inlet 22 by means of which oxygen or air is introduced into the solution of p-quinodimethane. The oxygen or air which is introduced through inlet 22 passes through a multitude of tiny openings 24 at the end of the inlet 22. The cold solution of p-quinodimethane as it is pumped into the copolymerization vessel 28 comes into contact with oxygen immediately and the solution is allowed to gradually warm up to room temperature (25° C.) while maintaining a high concentration of oxygen throughout the copolymerization reaction. Reaction zone 28 may be surrounded by a low temperature bath if desired but, in general, this is not necessary.

When the copolymerization is complete, the suspension of poly-p-xylylene peroxide is pumped from zone 28 into the decomposition zone 44 by means of conduit 30 having the gear pump 32 attached thereon. Alternatively, the suspension of poly-p-xylylene peroxide may be discharged from the copolymerization zone 28 by means of conduit 26, and stored as such until ready for use.

The decomposition zone 44 is fitted with an agitator 34, an electrically heated jacket 40 which is preferably maintained at a temperature between about 50° C. and about 150° C., an inlet 36 through which a suitable liquid heat transfer medium is introduced, and an outlet 38 by means of which a more volatile liquid carried over from the quenching or copolymerization reactions may be discharged. The decomposition vessel 44 is preferably a pressure vessel in which sufficient pressure, for example, up to 5 atmospheres, may be built up in order to maintain the liquid heat transfer medium in the liquid phase and thereby maintain the decomposition temperature within the desired range.

As above-discussed, it is preferred to conduct the quenching and copolymerization steps in a liquid such as acetone and to decompose the poly-p-xylylene peroxide polymer in a heat transfer liquid such as water. Thus, when the acetone solution containing poly-p-xylylene peroxide in suspension is passed into the water, for example, contained in the decomposition zone 44, the acetone distills and is discharged into a receiver, not shown, through the outlet 38 and may be recycled to the quenching vessel 8 or to the copolymerization zone 28. The hydrogen which forms as a by-product during the decomposition reaction is allowed to escape from zone 44 either by means of conduit 38 or another outlet not shown. The decomposition products as they are formed are then discharged through conduit 42 into a filtering drum 46 in which insoluble by-product such as poly-p-xylylene is separated. The clear solution containing the product is then discharged from zone 46 by means of conduit 50 and is separated into its various components such as terephthalaldehyde, p-hydroxymethyl benzaldehyde and p-xylylene glycol as herein described.

It is to be understood that the apparatus shown in the accompanying drawing may be adapted to carry out the other embodiments of the methods for conducting the reactions of the present invention. For example, the quenching and copolymerization steps may be carried out simultaneously in the vapor phase, for example, followed by a substantially instantaneous decomposition of the peroxide polymer, at a temperature between about 50° C. and about 200° C., with all of the steps being carried out in any one of the reaction vessels shown, any one of which may be electrically heated to the necessary decomposition temperature.

The process may also be carried out with a continuous transfer media from one reaction vessel to another, or in a batchwise manner by the proper use of the indicated valves which use is understood to those skilled in the art.

Among the specific 1,4-dimethyl substituted aromatic compounds which can be pyrolyzed to produce the quinodimethane used in the preparation of the novel peroxide polymer of the present invention are p-xylene and related methyl and halogen substituted p-xylenes such as pseudocumene, durene, isodurene, prehnitene, pentamethyl benzene, hexamethyl benzene, 2-chloro-p-xylene, 2-fluoro-p-xylene, 2-5-dichloro-p-xylene, 2,5-difluoro-p-xylene, 2,3,5-trichloro-p-xylene, 2,3,5-trifluoro-p-xylene, 2,3,5,6-tetrachloro-p-xylene, 2,3,5,6-tetrafluoro-p-xylene, 2-chloro-3,5,6-trimethyl benzene; 1,4-dimethyl naphthalene and related methyl and halogen substituted 1,4-dimethyl naphthalenes such as 1,2,3,4,6,7-hexamethyl naphthalene, 6-chloro-1,4-dimethyl naphthalene, and 2,3,6,7-tetrachloro-1,4-dimethyl naphthalene; and the corresponding heterocyclic compounds in which the aromatic ring contains at least two methyl groups which are in the 1 and 4 position to each other, such as 2,5-dimethyl pyrazine, 2,5-lutidine, 2,5-dimethyl pyrimidine, 5,8-dimethyl quinoline, 1,4-dimethyl isoquinoline, 5,8-dimethyl isoquinoline, 5,8-dimethyl quinazoline, 5,8-dimethyl quinoxaline, 2,3,5-trimethyl pyrazine, 2,3,5,6-tetramethyl pyrazine, 5,6,8-trimethyl quinoline, 2,3,5-trimethyl pyridine, and 2,5-dimethyl-6-chloropyrazine.

The preferred quinodimethanes used in accordance with the present invention are those obtained by pyrolysis, under the conditions described herein, of 1,4-dimethyl substituted benzenes containing between 0 and 2 methyl nuclear substituents and between 0 and 2 nuclear substituted normally gaseous halogen atoms. The preferred quinodimethane monomers are, therefore, p-quinodimethane, 2 - methyl quinodimethane, 2,3 - dimethylquinodimethane, 2-chloro-p-quinodimethane, 2-fluoro-p-quinodimethane, 2,5-difluoro-p-quinodimethane and the like.

The following examples are offered as a better understanding of the present invention and are not to be construed as unnecessarily limiting the scope of the present invention.

EXAMPLE 1

This example illustrates the preparation of p-quinodimethane monomer.

p-Xylene vapor at 5 mm. mercury pressure and preheated to 700° C. was led through a pyrolysis tube of 2.5 cm. diameter and 30 cm. in length at such a velocity that the average contact time was 0.05 second and heated to a pyrolysis temperature of 1000° C. The pyrolyzed vapors were passed directly to the top of a six liter, 3 necked flask containing 3.8 liters of a chloroform-carbon tetrachloride mixture (1:1 by volume) which was cooled in a bath of solid carbon dioxide-acetone to a temperature of —80° C. The chloroform-carbon tetrachloride mixture was continuously agitated to prevent localized heating. The liquid remained transparent for about two hours until the saturation limit was reached and then became opaque as solid p-xylene and solid p-quinodimethane precipitated out. The flask was disconnected from the train at the end of the run and the solid precipitate containing p-xylene was removed by filtration.

To prove that the mother liquor contained p-quinodimethane a portion of it was added at —80° C. to a solution of chloroform-carbon tetrachloride containing an excess of iodine. The mixture was allowed to warm to room temperature with occasional shaking but did not change in appearance. The excess iodine was neutralized with aqueous sodium thiosulfate and the organic liquid was washed with water to remove all traces of inorganic solids. The chloroform and carbon tetrachloride were removed under vacuum and the dry residue was recrystallized from methanol to give a light brown crystalline compound having a melting point of 176°–177° C. and 70.9 percent iodine. This corresponds to the reported melting point of 1,4-di-iodomethylbenzene, namely, 177°–178° C.

The remainder of the mother liquor containing p-quinodimethane was stored at a temperature of —80° C. until it was desired to react it with oxygen to form the peroxide polymer of the present invention.

p-Quinodimethane is similarly prepared in acetone, hexane, toluene and any of the other liquids suitable for quenching of the pyrolyzed vapor.

EXAMPLE 2

This example describes the copolymerization of p-quinodimethane and oxygen in acetone to produce poly-p-xylylene peroxide.

In a two-liter Erlenmeyer flask a solution of p-quinodimethane in acetone at —80° C. was gradually warmed to 0° C. while oxygen was bubbled through the solution at a rate of 0.5 cubic foot per minute with stirring at a rate of 250 r.p.m. The reaction was completed within an hour after which time the reaction mixture was warmed to room temperature (25° C.). The product thus formed was separated from the acetone by filtration and the filter cake washed with acetone and air dried. A quantitative yield of product, based upon the amount of p-quinodimethane available at the time the oxygen was introduced, was obtained. The product was analyzed and found to contain 70.5 percent carbon, 5.73 percent hydrogen and 23.8 percent oxygen corresponding to a ratio of

to combined oxygen, as —O—O—, of 1:1.

Infrared analysis of the product showed it to contain the peroxide linkage —O—O—, phenyl groups, and singly bonded methylene groups. Further elucidation of the structure of the product as poly-p-xylylene peroxide consisting essentially of the recurring unit,

is described in the following Example 3.

EXAMPLE 3

*Elucidation of the structure of poly-p-xylylene peroxide*

(1) To a stoppered filtration flask, was added 10 grams of the peroxide polymer prepared as described in Example 2, above. The flask was then evacuated to 2 mm. mercury pressure. The temperature was carefully and gradually raised from room temperature (25° C.) to 90° C. over a period of four hours. The decomposition products sublimed as soon as they were formed and condensed on the upper cooler surface of the flask. A solid sublimate mixture having a melting point of 40° C. to 90° C. was obtained in an 80 percent yield leaving 2 grams of still undecomposed residue.

(2) A 3 gram sample of the solid sublimate mixture obtained in part (1) of this example, and 10 grams of potassium dichromate were dissolved in 140 cc. of 15 percent aqueous sulfuric acid solution. The solution was warmed on a steam bath for a period of six hours during which time the temperature of the solution was maintained at 75° C. The resultant mixture was cooled and the crystalline product which settled out was filtered. The solid material was then added to a flask containing 20 cc. of methanol to which one drop of concentrated sulfuric acid was added and the solution was refluxed for three hours after which time the solution was concentrated to one-third its volume. The product which crystallized out of the solution when the solution was cooled to room temperature was collected, dried and found to have a melting point of 132° C. to 135° C. After recrystallization from hexane the melting point was raised to 138° C.–139° C. Further recrystallization of the product did not change its melting point. No lowering of the melting point was obtained when this product was admixed with an authentic sample of dimethyl terephthalate. No other product or byproduct was obtained. The melting point of dimethyl terephthalate as reported in the literature is 140° C. Thus oxidation of the mixture of products, obtained when the peroxide polymer of Example 2 was decomposed, led only to terephthalic acid, identified as the dimethyl ester, indicating that each of the decomposition products of part (1) of this example had the

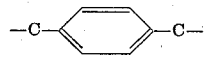

unit in common.

(3) A 5 gram sample of the decomposition product obtained as described in part 1 of this example was taken up with a minimum amount of benzene and added to an excess amount of hexane to give a resultant mixture containing 10 percent by volume of benzene and 90 percent by volume of hexane. The solution was passed through an alumina adsorption column using the eluants benzene-hexane (from 10 percent benzene increased up to 100 percent benzene) and benzene-methanol (from 10 percent methanol increased up to 100 percent methanol). Three compounds, namely, Compounds A, B, and C were obtained from the eluant fractions.

(4) Compound A obtained by the procedure of part (3) of this example had a melting point 112°–113° C. and was found to give a positive Tollens test and a negative Benedicts test indicating Compound A to be an aromatic aldehyde. A mixed melting point determination of this aromatic aldehyde admixed with an authentic sample of terephthalaldehyde (reported melting point is 114° C.) was found to be 112° C.–114° C.

A 0.3 gram sample of Compound A was added to 1.5 gram of hydroxylamine hydrochloride dissolved in 10 cc. of water. There were then added 10 cc. of a 10 percent aqueous solution of sodium hydroxide. After the mixture was gently agitated for about 10 minutes, the dilute basic solution was acidified and the insoluble dioxime was removed by filtration. The oxime thereby obtained was purified by recrystallization from water, and was found to have a melting point of 214° C.–215° C. No lowering of the melting point was observed when this oxime was admixed with an authentic sample of terephthaldoxime. These results prove Compound A to be terephthalaldehyde.

(5) Compound B, obtained according to the procedure of part (3) of this example, had a melting point of 116°–117° C., of molecular weight of 148; and gave a negative Tollens test, a positive Lucas test and a positive test for active hydrogen indicating Compound B to be an alcohol. The mixed melting point of this alcohol with an authentic sample of p-xylylene glycol was 110°–112° C. (The reported melting point of p-xylylene glycol is 112° C.) Analysis of Compound B showed it to contain 69.6 percent carbon and 6.67 percent hydrogen. The calculated percents of carbon and hydrogen for p-xylylene glycol are 69.9 and 7.24, respectively.

A 0.2 gram sample of Compound B was warmed with concentrated hydrochloric acid over a steam bath for one hour. The product which precipitated out of the warm solution was filtered, purified by sublimation and found to have a melting point of 95° C. to 97° C. Admixing this product with an authentic sample of p-xylylene chloride did not lower the melting point; mixed M.P. 95° C.–97° C.

It was, therefore, shown that Compound B was p-xylylene glycol.

(6) Compound C obtained by procedure of part (3) of this example, was found to have a melting point of 41.5° to 42.0° C. and a molecular weight of 136.1; and gave a positive Tollens' test and a negative Benedict's test, thereby indicating Compound C to be an aromatic aldehyde. Upon analysis for carbon and hydrogen content, Compound C was found to contain 70.1 percent carbon and 5.35 percent hydrogen. The calculated percents of carbon and hydrogen for p-hydroxymethyl benzaldehyde, reported in the literature as an oil, are 70.6 and 5.88, respectively.

A 1 gram sample of Compound C was added to an excess of hydroxylamine hydrochloride dissolved in 5 cc. of water. The solution was allowed to stand for 3 days but no crystallization occurred. The solution was then frozen and allowed to melt. The solid material which failed to go back into solution, was removed by filtration and was found to have a melting point of 118° C.–120° C. which melting point was raised to 120° C.–121° C. by recrystallization of the product from benzene. Analysis of the product showed it to be p-hydroxymethyl benzaldoxime. Found: 63.56 percent carbon; 6.04 percent hydrogen and 9.18 percent nitrogen. Calculated for p-hydroxymethyl benzaldoxime, $HOCH_2-C_6H_4-CH=NOH$; 63.52 percent carbon; 5.95 percent hydrogen and 9.27 percent nitrogen.

A 2.7 gram sample of Compound C was added to 30 cc. of an aqueous solution containing 3 grams of semicarbazine hydrochloride and 4.5 grams of sodium acetate. The white solid semicarbazone precipitated almost instantly. The mixture was warmed on a steam bath and cooled to room temperature. The white precipitate was removed by filtration and recrystallized from water to yield 3.5 grams of crystalline product having a melting point of 193°–197° C. The product was recrystallized from ethanol to yield white platelets, melting point 196°–197° C. This product was analyzed and was found to contain 61.1 percent carbon, 5.98 percent hydrogen, and 24.1 percent nitrogen. The calculated percent of carbon, hydrogen and nitrogen for the semicarbazone of p-hydroxymethyl benzaldehyde.

$$HOCH_2-C_6H_4-CH=NNHCONH_2$$

are: 61.0, 6.22 and 23.7, respectively.

The infrared analysis of this semicarbazone product was compatible with a structure having para substituents on the benzene ring, further substantiating the identification of Compound C as p-hydroxymethyl benzaldehyde.

It is, therefore, shown that inasmuch as Compounds A, B, and C, obtained upon the decomposition of the poly-p-xylylene peroxide polymer of Example 2, all have the

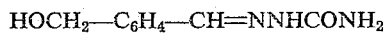

structure in common, and that inasmuch as terephthalaldehyde (A), p-xylylene glycol (B) and p-hydroxymethyl benzaldehyde (C) were the only compounds found as the products of decomposition, of the poly-p-xylylene peroxide polymer of Example 2, this peroxide polymer must, therefore, consist essentially only of the recurring unit,

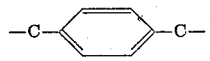

present as a successively recurring unit.

EXAMPLE 4

This example is intended to illustrate the fact that increasing the ratio of solution-oxygen interphase to solution phase increases the amount of oxygen incorporated into the polymer peroxide during its formation.

(1) Oxygen was bubled through a liter of 0.06 molar solution of p-quinodimethane in hexane at −80° C. at a rate of about 0.1 cubic foot per minute or at a rate of about 150 bubbles a minute, the bubbling action serving as the only means of agitating the soution. During this operation the solution was allowed to warm up gradually from −80° C. to room temperature (25° C.) over a period of 1 hour. The polymeric product was removed by filtration and the filter cake was washed with acetone and air dried. Analysis of the polymeric product showed it to contain 85.4 percent carbon, 6.8 percent hydrogen and 7.8 percent oxygen which data corresponds to a peroxide polymer containing the

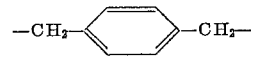

unit and peroxide linkage, —O—O—, in a ratio of about 3.5 to 1. Decomposition of this product in the solid state proceeded smoothly at a temperature of 100° C. The products of this decomposition are terephthalaldehyde, p-xylylene glycol and p-hydroxymethyl benzaldehyde. Poly-p-xylylene is obtained as a by-product of the decomposition.

(2) Oxygen was bubbled through a liter of a 0.06 molar solution of p-quinodimethane in hexane at −80° C. at a rate of 0.1 cubic foot per minute while the solution was agitated by means of a motor driven stirrer at a rate of 600 r.p.m. During this operation the solution was allowed to warm up gradually from −80° C. to room temperature (25° C.) over a period of 1 hour. The polymeric product was removed by filtration and the filter cake was washed with acetone and air dried. Analysis of the polymeric product showed it to contain 70.1 percent carbon, 6.6 percent hydrogen and 23.3 percent oxygen which data corresponds to a peroxide polymer containing the

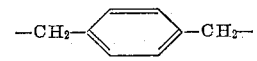

unit and peroxide linkage, —O—O—, in a ratio of about 1 to 1. Decomposition of this product in the solid state proceeded violently at a temperature of 100° C. No poly-p-xylylene polymer is obtained as a by-product of this decomposition.

The effect of the vigorous agitation employed in part (2) of this example, was to increase the ratio of solution-oxygen interphase to solution phase, thereby leading to a peroxide polymer having a maximum number of peroxide linkages. When only moderate or slow agitation of the solution was employed, as in part (1) of this example, the oxygen content of the resultant peroxide polymer was decreased considerably.

EXAMPLE 5

This example is intended to illustrate the effect of the presence of an organic aldehyde on the copolymerization of oxygen with a quinodimethane.

A series of runs was made in which various amounts of benzaldehyde were added to 1 liter of a cold hexane solution of p-quinodimethane, the mole ratio of benzaldehyde to p-quinodimethane in each run being as shown in Table I below. In each run oxygen was bubbled through the solution at −80° C. at a rate of about 250 bubbles a minute, the bubbling action also serving as the means of agitation. Each solution was warmed up gradually from −80° C. to room temperature (25° C.) over a period of 1 hour, after which time no more oxygen was introduced into the solution. The polymer peroxide was then collected by filtration, dried and analyzed. The results of these runs are shown in Table I which results indicate that the use of an aldehyde such as benzaldehyde facilitates the addition of oxygen to the quinodimethane monomer.

TABLE I

| Run Number | 1 | 2 | 3 | 4 | 5 |
|---|---|---|---|---|---|
| Ratio: Moles of Benzaldehyde/Moles of p-quinodimethane | 0 | 0.2 | 0.4 | 0.7 | 7.0 |
| Percent Oxygen in Peroxide Polymer | 7.8 | 12.1 | 14.9 | 17.0 | 24.8 |
| Ratio: —CH₂—⟨ ⟩—CH₂ in / —O—O— Peroxide Polymer | 3.5 | 2.3 | 1.9 | 1.5 | 1.0 |

EXAMPLE 6

This example illustrates the preparation of terephthalaldehyde in high yield and selectivity.

A 5 gram sample of poly-p-xylylene peroxide, prepared according to the procedure of Example 2 above, and 50 cc. of water were charged to a glass lined bomb. The bomb was sealed and placed in a constant temperature bath for 3 hours at 125° C. The bomb was cooled and the hydrogen which was produced was allowed to escape and was collected. A total volume of 600 cc. of hydrogen, measured at 23° C. and at 1 atmosphere, was collected. The aqueous decomposition mixture was extracted with an equal volume of ether and the ether extract evaporated to dryness. The ether extract was recrystallized from a minimum amount of water to yield terephthalaldehyde, melting point 110°–112° C. in 90 percent yield. The other products of decomposition were p-hydroxymethyl benzaldehyde and minor amounts of p-xylylene glycol which remained in the aqueous solution.

Decomposition of the poly-p-xylylene peroxide of Example 4 above, following the same procedure of this example, also leads to the formation of terephthalaldehyde in almost quantitative yield.

When poly-p-xylylene peroxide was decomposed in water at a temperature of 135° C. following the procedure of this example, terephthalaldehyde was obtained in a 60 percent yield, and at 100° C. it was obtained in about a 63 percent yield.

EXAMPLE 7

This example illustrates the preparation of p-xylylene glycol in good yield.

A 5 gram sample of poly-p-xylylene peroxide prepared according to the procedure of Example 2 above, and 50 cc. of a 10 percent aqueous solution of ferrous sulfate were charged to a glass lined bomb. The bomb was sealed and placed in a constant temperature bath maintained at a temperature of 100° C. over a period of 48 hours. At the end of this period, the reaction mixture was cooled, unreacted polymer (1.0 gram) was removed by filtration, and the water solution was exhaustively extracted with ether. A 60 percent yield of p-xylylene glycol was obtained and essentially no terephthalaldehyde.

When this procedure is repeated with the addition of elemental iron filings to the initial charge of reactants, and when the decomposition is allowed to occur at 65° C. over a period of about 5 days, about an 80 percent yield of p-xylylene glycol is obtained.

EXAMPLE 8

This example illustrates the preparation of p-hydroxymethyl benzaldehyde in high yield and selectively.

Poly-p-xylylene peroxide (5 grams) and 50 cc. of water are sealed in a bomb and placed in a constant temperature bath at 65° C. The decomposition is allowed to take place over a period of one week. The hot solution is filtered to remove unreacted poly-p-xylylene and the solution is cooled and exhaustively extracted with ether. A yield of about 70 percent p-hydroxymethyl benzaldehyde and 20 percent terephthalaldehyde is obtained.

Other typical examples of the novel peroxide polymer produced in accordance with the foregoing description and examples are those containing the following recurring units:

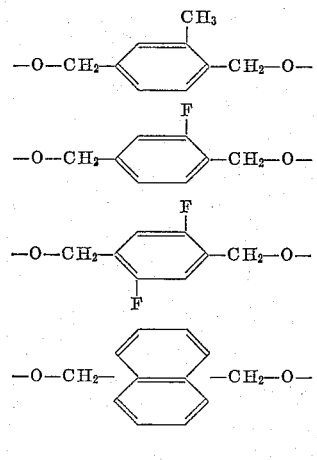

and

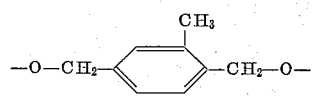

which peroxide polymers are prepared by copolymerizing oxygen with 2-methyl-p-quinodimethane, 2-fluoro-p-quinodimethane, 2,5-difluoro-p-quinodimethane, p-naphthaquinodimethane and 3-methyl-2,5-quinopyridyldimethane, respectively.

The nature of the end group of the novel polymer peroxide of the present invention is relatively difficult to determine inasmuch as it is such a small group as compared to the rest of the polymer. It is postulated without limiting the scope of the present invention, however, that the end groups include a formyl group, a hydroxymethyl group or a methyl group depending upon the actual mechanism of the polymerization reaction. The novel peroxide polymer of the present invention may also be a cyclic polymer. However, no matter whether the novel peroxide polymer is a linear or a cyclic polymer, or a mixture of both, the decomposition of the polymer proceeds as hereindescribed.

It is within the scope of the present invention to polymerize mixtures of the symmetrically unsaturated quinodimethanes in the presence of oxygen to produce a novel peroxide polymer containing a recurring peroxide linkage and recurring aromatic nuclei corresponding to the cyclic nuclei of the quinodimethanes employed.

Peroxy promoters such as potassium persulfate, for example, may be added to the reaction medium during the polymerization reaction without departing from the scope of the present invention.

Among the specific aromatically unsaturated compounds which are obtained upon thermal decomposition of the novel peroxide polymers of this invention, other than those which have been mentioned already, are those having the following structures:

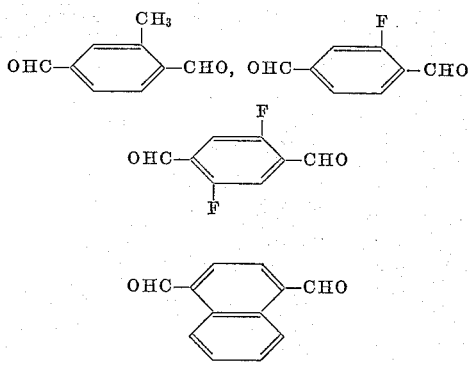

as well as the corresponding 1,4-glycols and 1,4-hydroxymethyl aldehydes.

This invention relates to a process for the preparation of a novel peroxide polymer which comprises polymerizing a quinodimethane in the presence of oxygen. The novel peroxide polymer thereby produced in then decomposed yielding useful aromatic compounds. The method of effecting the copolymerization reaction and the decomposition reaction may be any of the various procedures hereindescribed, and various modifications and alterations of these procedures may become apparent to those skilled in the art without departing from the scope of this invention.

We claim:

1. The process of preparing a peroxide polymer which comprises pyrolyzing an aromatically unsaturated compound having at least one six-membered cyclic nucleus, said nucleus having at least two methyl groups bonded to nuclear carbon atoms which are in the one and four positions relative to each other and having additional nuclear substitution selected from at least one of the group consisting of the normally gaseous halogen atoms, hydrogen and methyl radicals, at a temperature between about 700° C. and about 1300° C. and at a total pressure not higher than about 400 mm. mercury for a period of not more than one second, quenching the pyrolyzed vapors to a temperature below about 200° C. to produce a quinodimethane and copolymerizing said quinodimethane with at least 0.1 mol of oxygen per mole of quinodimethane to produce a peroxide polymer, said quinodimethane not being subjected to polymerization conditions prior to contact with said oxygen.

2. The process of claim 1 in which said aromatically unsaturated compound is a 1,4-dimethyl substituted benzene containing from 0 to 2 additional methyl nuclear substituents.

3. The process of claim 1 in which said aromatically unsaturated compound is a 1,4-dimethyl substituted benzene containing from 1 to 2 normally gaseous halogen atoms as nuclear substituents.

4. The process of preparing a peroxide polymer which comprises pyrolyzing an aromatically unsaturated compound having at least one six-membered cyclic nucleus, said nucleus having two methyl groups bonded to nuclear carbon atoms which are in the 1 and 4 position to each other and having additional nuclear substitution selected from at least one of the group consisting of the normally gaseous halogen atoms, hydrogen and methyl radicals, at a temperature between aobut 950° C. and about 1300° C. and at a partial pressure below 150 mm. mercury for a period of time ranging from 0.001 to 0.1 second, quenching the pyrolyzed vapor to a temperature between about —45° C. and about 50° C. to produce a quinodimethane, and simultaneously copolymerizing said quinodimethane with at least 0.1 mol of oxygen per mol of quinodimethane, at a temperature between about —45° C. and about 50° C. to produce a peroxide polymer, and recovering the peroxide polymer as the product of the process.

5. The process of preparing a peroxide polymer which comprises pyrolyzing an aromatically unsaturated compound having at least one six-membered cyclic nucleus, said nucleus having two methyl groups bonded to nuclear carbon atoms which are in the 1 and 4 position to each other and having additional nuclear substitution selected from at least one of the group consisting of the normally gaseous halogen atoms, hydrogen and methyl radicals, at a temperature between about 950° C. and about 1300° C. and at a partial pressure below 10 mm. mercury for a period of time ranging from about 0.001 to about 0.1 second, quenching the pyrolyzed vapor in a cold liquid to a temperature below about —45° C. to produce a quinodimethane, introducing at least 0.1 mol of oxygen per mol of quinodimethane into said cold liquid and permitting the solvent to warm up to room temperature and thereby deposit the desired peroxide polymer.

6. The process of preparing a peroxide polymer which comprises pyrolyzing p-xylene at a temperature between about 950° C. and about 1300° C. for a period of time ranging from about 0.001 to about 0.1 second and at a partial pressure below 150 mm. mercury, quenching the pyrolyzed vapor in a cold liquid to a temperature below about —45° C., to produce p-quinodimethane, introducing atmospheric oxygen into said cold liquid and permitting the liquid to warm up to room temperature and thereby deposit the desired polymer.

7. The process of preparing a peroxide polymer which comprises polymerizing a quinodimethane containing a symmetrically diunsaturated six-membered cyclic nucleus to which two methylene groups are doubly bonded to nuclear carbon atoms at a temperature below 50° C. in the presence of at least 0.1 mol of oxygen per mol of said quinodimethane, said quinodimethane not being subjected to polymerization conditions prior to contact with said oxygen.

8. The process of preparing a peroxide polymer which comprises polymerizing a quinodimethane containing a symmetrically diunsaturated six-membered cyclic nucleus to which two methylene groups are doubly bonded to nuclear carbon atoms in the one and four positions with respect to each other at a temperature between about —80° C. and about 50° C. in the presence of at least 0.1 mol of oxygen per mol of said quinodimethane, said oxygen and quinodimethane being in solution in a polar solvent, said quinodimethane not being subjected to polymerization conditions prior to contact with said oxygen.

9. The process of preparing a peroxide polymer which comprises polymerizing a quinodimethane containing a diunsaturated six-membered ring to which two methylene groups are doubly bonded to nuclear carbon atoms in the one and four positions with respect to each other at a temperature below —45° C. in the presence of at least 0.1 mole of oxygen per mol of said quinodimethane, said oxygen and quinodimethane being in solution in a polar solvent, and permitting the solution to warm up to room temperature and thereby deposit the peroxide polymer as the product of the process, said quinodimethane not being subjected to polymerization conditions prior to contact with said oxygen.

10. The process of preparing a peroxide polymer containing the recurring unit

which comprises polymerizing p-quinodimethane in the presence of at least 0.1 mol of oxygen per mol of p-quinodimethane at a temperature below —45° C., said oxygen and p-quinodimethane being in solution in a polar solvent, said quinodimethane not being subjected to polymerization conditions prior to contact with said oxygen, and permitting the solution to warm up to room temperature and thereby deposit the peroxide polymer, and recovering said peroxide polymer as the product of the process.

11. A solid peroxide polymer consisting essentially of from about 10 to 100 percent of the recurring unit

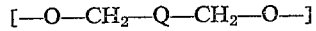

and from about 0 to 90 percent of the recurring unit

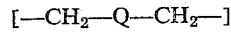

wherein Q is at least one six-membered ring having aromatic unsaturation the remaining nuclear substitution of said Q being selected from at least one of the group consisting of the normally gaseous halogen atoms, hydrogen and methyl radicals.

12. A solid peroxide polymer consisting essentially of from about 10 to 100 percent of the recurring unit

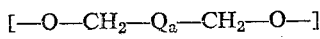

and from about 0 to 90 percent of the recurring unit

[—CH₂—Q_a—CH₂—]

wherein Q_a is a benzene nucleus bonded at nuclear carbon atoms which are in the 1 and 4 position to each other and contains from 0 to 2 methyl nuclear substituents.

13. A solid peroxide polymer consisting essentially of from about 10 to 100 percent of the recurring unit

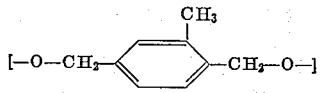

and from about 0 to 90 percent of the recurring unit

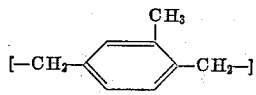

14. A solid peroxide polymer consisting essentially of from about 10 to 100 percent of the recurring unit

[—O—CH₂—Q_b—CH₂—O—]

and from about 0 to 90 percent of the recurring unit

[—CH₂—Q_b—CH₂—]

wherein Q_b is a benzene nucleus bonded at nuclear carbon atoms which are in the 1 and 4 position to each other and contains from 0 to 2 normally gaseous halogen atoms as nuclear substituents.

15. A solid peroxide polymer consisting essentially of from about 10 to 100 percent of the recurring unit

and from about 0 to 90 percent of the recurring unit

16. A solid peroxide polymer consisting essentially of from about 10 to 100 percent of the recurring unit

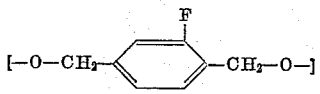

and from about 0 to 90 percent of the recurring unit

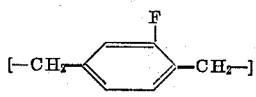

17. A solid peroxide polymer consisting essentially of from about 10 to 100 percent of the recurring unit

[—O—CH₂—Q—CH₂—O—]

and from about 0 to 90 percent of the recurring unit

[—CH₂—Q—CH₂—]

wherein Q is a naphthalene nucleus bonded at nuclear carbon atoms which are in the 1 and 4 position to each other, the nuclear substitution of said naphthalene nuclei being selected from at least one of the group consisting of the normally gaseous halogen atoms, hydrogen and methyl radicals.

18. A solid peroxide polymer consisting essentially of from about 10 to 100 percent of the recurring unit

[—O—CH₂—Q—CH₂—O—]

and from about 0 to 90 percent of the recurring unit

[—CH₂—Q—CH₂—]

wherein Q is at least one six-membered ring having aromatic unsaturation and is bonded at carbon atoms which are in the 1 and 4 position to each other and wherein Q contains at least one heteronitrogen atom vicinal only to nuclear carbon atoms of said ring.

19. A solid peroxide polymer consisting essentially of from about 10 to 100 percent of the recurring unit

[—O—CH₂—Q—CH₂—O—]

and from about 0 to 90 percent of the recurring unit

[—CH₂—Q—CH₂—]

wherein Q is at least one six-membered ring having aromatic unsaturation and is bonded at carbon atoms which are in the 1 and 4 position to each other, the remaining nuclear substitution of said Q being selected from at least one of the group consisting of the normally gaseous halogen atoms, hydrogen and methyl radicals.

References Cited by the Examiner

UNITED STATES PATENTS

| | | | |
|---|---|---|---|
| 2,898,377 | 8/59 | Handy et al. | 260—61 |
| 2,911,436 | 11/59 | Miller et al. | 260—61 |
| 3,084,146 | 4/63 | Errede | 260— |

MURRAY TILLMAN, *Primary Examiner.*

JOSEPH R. LIBERMAN, *Examiner.*

UNITED STATES PATENT OFFICE
CERTIFICATE OF CORRECTION

Patent No. 3,198,755    August 3, 1965

Stafford L. Hopwood, Jr., et al.

It is hereby certified that error appears in the above numbered patent requiring correction and that the said Letters Patent should read as corrected below.

Column 3, line 9, for "or" read -- on --; line 51, for "liquid" read -- quinoid --; column 7, line 29, for "units" read -- unit --; column 9, line 25, strike out "inch"; line 69, for "A-$Q_b$" read -- A-$Q_b$-B --.

Signed and sealed this 15th day of March 1966.

(SEAL)

Attest:

ERNEST W. SWIDER  
Attesting Officer

EDWARD J. BRENNER  
Commissioner of Patents